US010740832B2

(12) United States Patent
Mehta et al.

(10) Patent No.: US 10,740,832 B2
(45) Date of Patent: Aug. 11, 2020

(54) COMPUTER-IMPLEMENTED METHOD AND SYSTEMS FOR USING TRANSACTION DATA TO GENERATE OPTIMIZED EVENT TEMPLATES BASED ON A REQUESTED EVENT TYPE

(71) Applicant: Coupa Software Incorporated, San Mateo, CA (US)

(72) Inventors: Justin Mehta, Belmont, CA (US); Andrew Miller, San Mateo, CA (US); Scott Harris, Menlo Park, CA (US)

(73) Assignee: Coupa Software Incorporated, San Mateo, CA (US)

( * ) Notice: Subject to any disclaimer, the term of this patent is extended or adjusted under 35 U.S.C. 154(b) by 243 days.

(21) Appl. No.: 15/815,632

(22) Filed: Nov. 16, 2017

(65) Prior Publication Data

US 2019/0147526 A1 May 16, 2019

(51) Int. Cl.
*G06Q 30/00* (2012.01)
*G06Q 30/06* (2012.01)
(52) U.S. Cl.
CPC ................ *G06Q 30/0641* (2013.01)
(58) Field of Classification Search
CPC ...................... G06Q 30/0601–0645
USPC ............................. 705/26.1–27.2
See application file for complete search history.

(56) References Cited

U.S. PATENT DOCUMENTS

| 10,304,056 B1* | 5/2019 | Izenson | G06Q 20/40 |
| | | | 705/44 |
| 2008/0077493 A1* | 3/2008 | Geffert | G06Q 30/00 |
| | | | 705/14 |
| 2009/0144070 A1* | 6/2009 | Psota | G06Q 99/00 |
| | | | 705/1 |
| 2012/0215657 A1* | 8/2012 | Compton | G06Q 30/06 |
| | | | 705/26.8 |
| 2014/0032362 A1* | 1/2014 | Frayman | G06Q 30/0633 |
| | | | 705/26.8 |

(Continued)

OTHER PUBLICATIONS

Nasr-Eddine Dahel. (2003). Vendor selection and order quantity allocation in volume discount environments. Supply Chain Management, 8(3), 335-342. doi:http://dx.doi.org/10.1108/13598540310490099 (Year: 2003).*

*Primary Examiner* — Resha Desai
*Assistant Examiner* — Kennedy Gibson-Wynn
(74) *Attorney, Agent, or Firm* — Elliot H. Karlin; Hickman Palermo Becker Bingham LLP

(57) ABSTRACT

Systems and methods for generating event templates for requested event types are described herein. In an embodiment, a server computer receives transactional data describing transactions between a plurality of computing devices. The server computer uses the transactional data to identify a plurality of instances of a particular event type by determining, for each instance, that a plurality of transactions associated with a particular computing device relate to an event of the particular event type. The server computer uses the transactional data related to the plurality of instances of the particular event type to determine a plurality of items for the particular event type. When the server computer receives a request from a client computing device to generate an event, the server computer generates and displays an event template which identifies the plurality of items.

17 Claims, 6 Drawing Sheets

(56) References Cited

U.S. PATENT DOCUMENTS

| | | | |
|---|---|---|---|
| 2014/0164162 A1* | 6/2014 | Rabenold | G06Q 30/08 |
| | | | 705/26.3 |
| 2015/0106243 A1* | 4/2015 | Blackhurst | G06Q 40/12 |
| 2015/0120486 A1* | 4/2015 | Haidet | G06Q 30/0611 |
| 2017/0262927 A1* | 9/2017 | Zak | G06Q 30/0633 |
| 2017/0323241 A1* | 11/2017 | Gauba | G06Q 10/06315 |
| 2018/0240167 A1* | 8/2018 | Kumar | G06Q 30/0605 |

* cited by examiner

COMPUTER-IMPLEMENTED METHOD AND SYSTEMS FOR USING TRANSACTION DATA TO GENERATE OPTIMIZED EVENT TEMPLATES BASED ON A REQUESTED EVENT TYPE

FIELD OF THE INVENTION

The present disclosure is in the technical field of configurable software platforms and platform interfaces. The disclosure also is in the technical field of transaction tracking between computing devices and generation of software templates based on the tracked transactions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many software packages provide interfaces for facilitating transactions between computing devices. The transactions often include data identifying the computing devices involved in the transaction, a goal of the transaction, and transaction parameters.

In some cases, the transactions may not be optimized for specific computing devices. For example, a first computing device may not have access to data indicating which computing devices are capable of performing the transaction, which computing devices will provide the best benefit when performing transactions, or which transaction parameters to set for initiating transactions or transaction events. Additionally, when a computing device initiates an event, the computing device may lack data as to what transactions need to be incorporated into the event.

While a server computer facilitating the transactions through the software platform stores data relating to past transactions and past events, the data is often not uniform in the way computing devices are identified, events are identified, or items of transactions are identified. For example, different computing devices may perform a similar type of event with similar transactions, but refer to the items and events using different identifiers.

Thus, there is a need for a system that can facilitate transactions by identifying computing devices capable of performing the requested transactions. Additionally, there is a need for a system which can generate templates for building optimal software events with a plurality of computing devices for different event types based on prior transaction data.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, embodiments may be practiced without these specific details. In other instances, well-known structures and devices are shown in block diagram form in order to avoid unnecessarily obscuring the present disclosure.

1. General Overview

Systems and methods for identifying computing devices capable of performing transactions are described herein. According to an embodiment, a server computer tracks transactions between computing devices. Using the tracked transaction data, the server computer identifies prior transaction events where each transaction event is identified as a plurality of transactions associated with a same computing device which relate to the same event. The server computer uses the transaction data relating to the prior transaction events to identify a plurality of items for a particular event type. The server is then able to use the identified plurality of items to generate an event template when a client computing device sends a request to create an event of the particular event type.

In an embodiment, a method comprises receiving transactional data describing transactions between a plurality of computing devices; using the transactional data, identifying a plurality of instances of a particular event type by determining, for each instance, that a plurality of transactions associated with a particular computing device relate to an event of the particular event type; using the transactional data related to the plurality of instances of the particular event type, determining a plurality of items for the particular event type; receiving, from a client computing device, an event generation request for an event of the particular event type; generating an event template which identifies the plurality of items; displaying, through a graphical user interface executing on the client computing device, the event template.

2. System Overview

Figure 1:
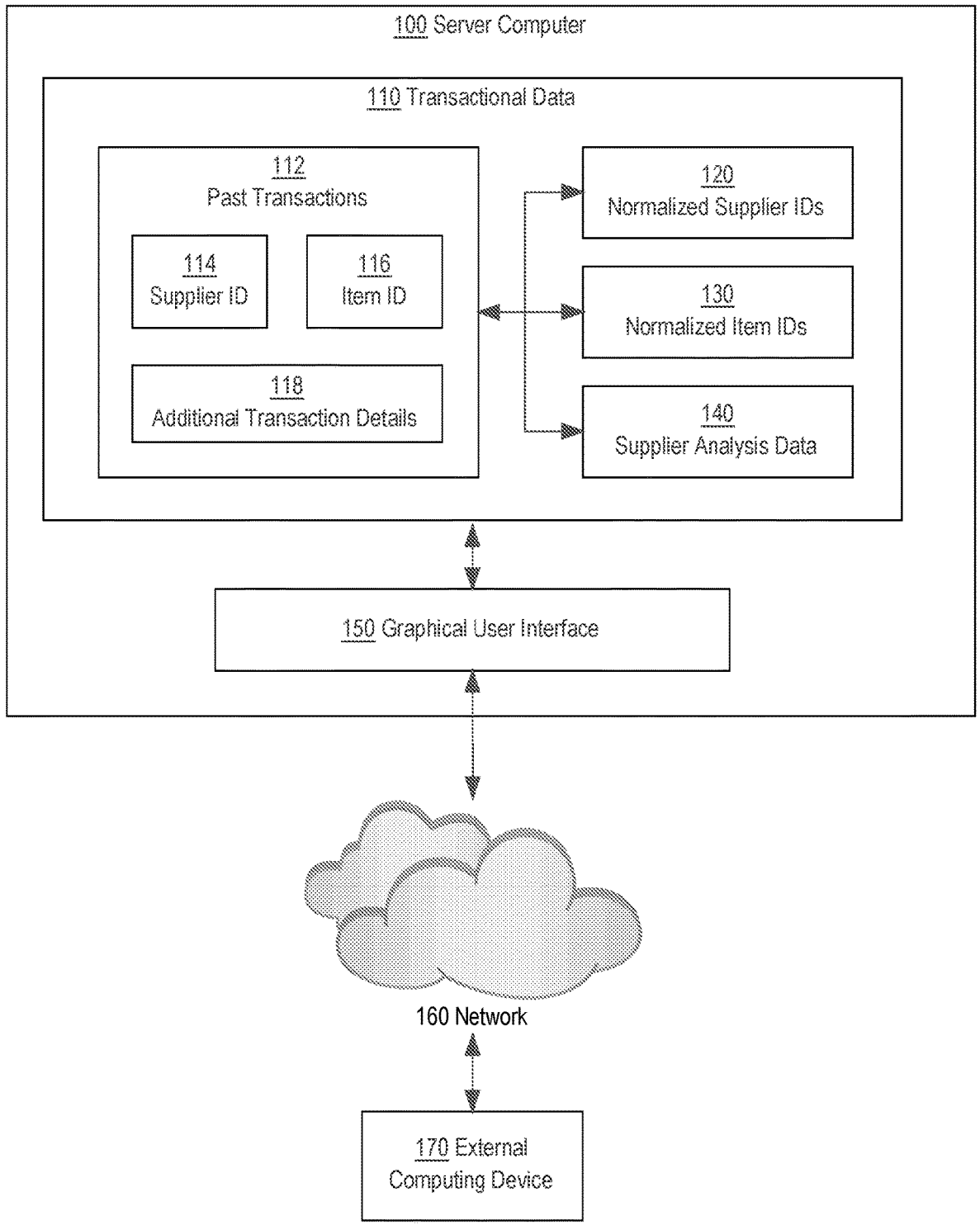
FIG. 1 depicts an example system in which the techniques described may be implemented according to an embodiment.

FIG. 1 depicts an example system in which the techniques described may be implemented according to an embodiment. In the example of FIG. 1, a server computer 100 and an external computing device 170 are communicatively coupled to a data communications network 160. The network 160 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 100, external computing device 170, and other elements of the system may each comprise an interface compatible with the network 160 and are programmed or configured to use standardized protocols for communication across the networks such as TCP/IP, Bluetooth, and higher-layer protocols such as HTTP, TLS, and the like.

Server computer 100 may be implemented using a server-class computer or other computers having one or more processor cores, co-processors, or other computers. Server computer 100 may be a physical server computer and/or a virtual server instance stored in a data center, such as through cloud computing. The server computer 100 may be programmed or configured to store transaction data and analyze the transaction data in order to generate templates and/or recommendations. The server computer may comprise a plurality of communicatively coupled server computers including a server computer for storing past transaction data and a server computer for displaying the graphical user interface to external computing device 170. Server computer 100 stores past transactional data 110 and graphical user interface 150.

Transactional data 110 includes data regarding transactions through one or more software platforms. The transactional data 110 includes data regarding past transactions 112, and data generated from the past transactions, such as the normalized supplier IDs 120, the normalized item IDs 130, and the supplier analysis data 140. The transactional data 110 may be used to generate recommendations, such as supplier recommendations, or templates, such as event sourcing templates.

Past transactions 112 include transactional data between a plurality of customers and a plurality of suppliers. The past transactions 112 include a supplier ID 114 which identifies the supplier in the transaction, an item ID 116 which identifies at least one item purchased in the transaction, and additional transaction details 118. Additional transaction details 118 may include additional data regarding the transaction, such as a tag for the transaction, a billing code for the purchaser, a number of items purchased, a price per unit of the items, identifiers of one or more other suppliers that bid against the supplier of the transaction, contact information for the supplier, and other transaction details. In an embodiment, the server computer 100 may additionally store data separate from the transactions that are related to the transactions. For example, the server computer 100 may store supplier profiles that identify suppliers, contact information for the suppliers, win rate for the suppliers, and past transactions of the suppliers.

Transactional data additionally includes data generated from past transactions. Normalized supplier IDs 120 comprise identifiers of suppliers that have been normalized across a plurality of different transactions. Normalized item IDs 130 comprise identifiers of items that have been normalized across a plurality of different transactions. The normalized item IDs may include a particular item, such as brand name, or a general item type, such as "office chair" or "desk." Supplier analysis data 140 comprises supplier specific information derived from past transactions, such as supplier win-rate, supplier health score, supplier rating, average prices for commodities, and other supplier specific data.

Graphical user interface 150 comprises instructions for generating an interface for displaying purchase options, supplier information, and performing transactions. The graphical user interface 150 may include options for searching for suppliers, transacting with the suppliers, sourcing supplier events, and/or executing supplier events.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 100.

External computing device 170 is a computer that includes hardware capable of communicatively coupling external computing device 170 to one or more server computers, such as server computer 100 over one or more service providers. For example, client computing device 170 may include a network card that communicates with server computer 100 through a home or office wireless router (not illustrated in FIG. 1) coupled to an internet service provider. External computing device 170 may be a server-class computer, smart phone, personal computer, tablet computing device, PDAs, laptop, or any other computing device capable of transmitting and receiving information and performing the functions described herein.

FIG. 1 depicts server computer 100 and external computing device 170 as distinct elements for the purpose of illustrating a clear example. However, in other embodiments, more or fewer server computers may accomplish the functions described herein. For example, a plurality of external computing devices may connect to the server computer 100. Additionally, server computer 100 may comprise a plurality of communicatively coupled server computers including a server computer for storing past transaction data and a server computer for displaying the graphical user interface to external computing device 170.

3. Supplier Provider

Figure 2:
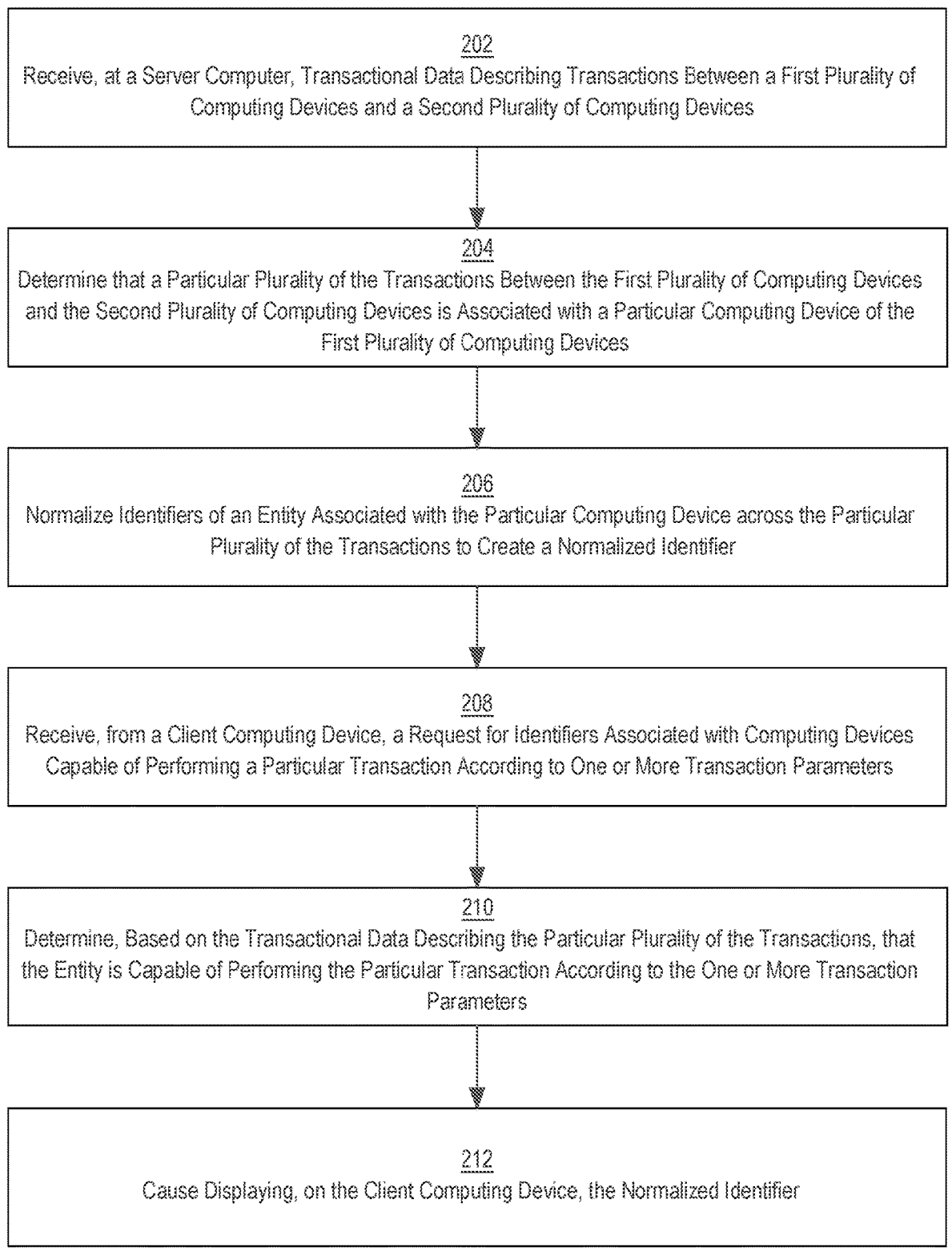
FIG. 2 depicts a method for generating transaction recommendations based on prior transactions.

FIG. 2 depicts a method for generating transaction recommendations based on prior transactions.

At step 202, transactional data describing transactions between a first plurality of computing devices and a second plurality of computing devices is received. For example, the server computer may receive transaction data between a plurality of customers and a plurality of suppliers. In an embodiment, the server computer facilitates one or more of the transactions through a graphical user interface and stores the data relating to the transactions. The transaction data may include any of a customer identifier, a supplier identifier, a customer generated tag, product information, pricing information, a billing code, location data, a rating for a supplier of the transaction, event data, and any other data associated with the transactions. While transactions are generally described in terms of supplying of goods, a transaction may additionally comprise the purchase of services and/or a combination of goods and services. The server computer may additionally receive information that is not specific to individual transactions, such as public contact information of suppliers, website URLs for suppliers, and catalogue information for suppliers.

At step 204, the system determines a particular plurality of the transactions between the first plurality of computing devices and the second plurality of computing devices is associated with a particular computing device of the first plurality of computing devices. At step 206, identifiers of an entity associated with the particular computing device are normalized across the particular plurality of the transactions to create a normalized identifier. For example, the transaction data may include an identifier of the supplier. If transaction data varies in format and/or source, the identities of the supplier may differ among transactions. For instance, a supplier may be identified as R&M in one transaction and as M&R in a second transaction.

Various methods may be used to determine that a plurality of transactions is associated with the same supplier. At a basic level, the server computer may identify all transactions that include the same supplier identifier as being associated with the same supplier. Where supplier identifiers differ, the server computer may use different techniques to determine whether two supplier identifiers refer to the same supplier. For example, the server computer may determine whether a website URL matches between the suppliers or whether other contact information, such as phone number or address, match between the suppliers.

In an embodiment, the server computer trains a machine learning tool for normalizing supplier identifiers. For example, training datasets may be generated based on prior transactions that were already identified as being associated with specific suppliers, such as through manual verification. The server computer may train the machine learning network using the training datasets which include transaction data and supplier identifiers. The server computer may then use transactions without identified suppliers as input into the machine learning model in order to identify suppliers from the transaction data.

Normalizing the supplier identifiers may generally include selecting a particular supplier identifier for a supplier and storing data with each transaction that identifies the supplier using the particular supplier identifier. For example, if R&M is selected as the normalized supplier identifier for a particular supplier, then the server computer may adjust non-matching supplier identifiers that have been identified as being associated with the particular supplier, such as M&R, to match the supplier identifier of R&M.

Selection of the identifier to which the supplier identifiers are to be normalized may be based on frequency of the identifiers and/or on specific selections of the identifiers. For example, if the supplier has a profile through a transaction management system hosted by the server computer, then the server computer may use the supplier name from the supplier profile as the normalized identifier. Additionally or alternatively, the supplier identifier for normalization may be manually selected during verification of training data for the machine learning model. Thus, the machine learning model may be configured to output normalized supplier identifiers for each of the transactions.

At step 208, a request for identifiers associated with computing devices capable of performing a particular transaction according to one or more transaction parameters is received. For example, the server computer may receive a request from a client computing device for suppliers that can supply a particular quantity of a particular item to a particular location. The request may be a request for a specific item, a specific type of item, or for sourcing a particular event. For example, the request may be for fifteen office chairs, fifteen of a particular brand of office chair, and/or for sourcing an office for fifteen people. Methods for determining an item and a quantity of an item from a sourcing request are described further herein.

In an embodiment, the server computer provides a graphical user interface for requesting suppliers for suppliers for particular items. The interface may include a drop-down menu or editable text box for identifying the item, a separate option for identifying a number of the item being requested, and an option for identifying a location to which the item is to be shipped. The interface may include options for filtering searches based on different criteria, such as price, location, and rating. In an embodiment, the interface includes options for specifying a type of item, such as an office chair, and/or a particular item, such as a brand of office chair.

At step 210, the system determines, based on the transactional data describing the particular plurality of the transactions, that the entity is capable of performing the particular transaction according to the one or more transaction parameters. For example, the server computer may use the past transactions associated with a particular supplier to determine that the supplier is capable of providing the specified item, the specified quantity of the item, and/or an item to the specified location. Methods for determining that the particular supplier is capable of fulfilling the purchase request are described further herein.

At step 212, the system causes displaying, on the client computing device, the normalized identifier. For example, the server computer may display a list of suppliers that are capable of performing the particular transaction. The server computer may filter the list by one or more factors, such as a supplier health score, which is described in U.S. patent application Ser. No. 15/683,689, filed Aug. 22, 2017, the entire contents of which are incorporated by reference as if fully disclosed herein. The server computer may additionally order the list based on one or more factors, such as prior relationships, supplier ratings, win rate, and average price for the item. Methods of filtering and ordering suppliers are described further herein.

Displayed suppliers may be available for selection through the graphical user interface for sourcing the requested item. For example, a graphical user interface may display, on the client computing device, potential suppliers for a requested item. When a supplier is selected, the server computer may facilitate a transaction between the client computing device and a computing device associated with the supplier. Where the supplier does not have an account with the system, the server computer may send a message to the supplier based on stored contact data from prior transactions in order to facilitate the transaction and/or provide the supplier with an opportunity to create an account with the system.

4. Filtering Supplies

Figure 3:
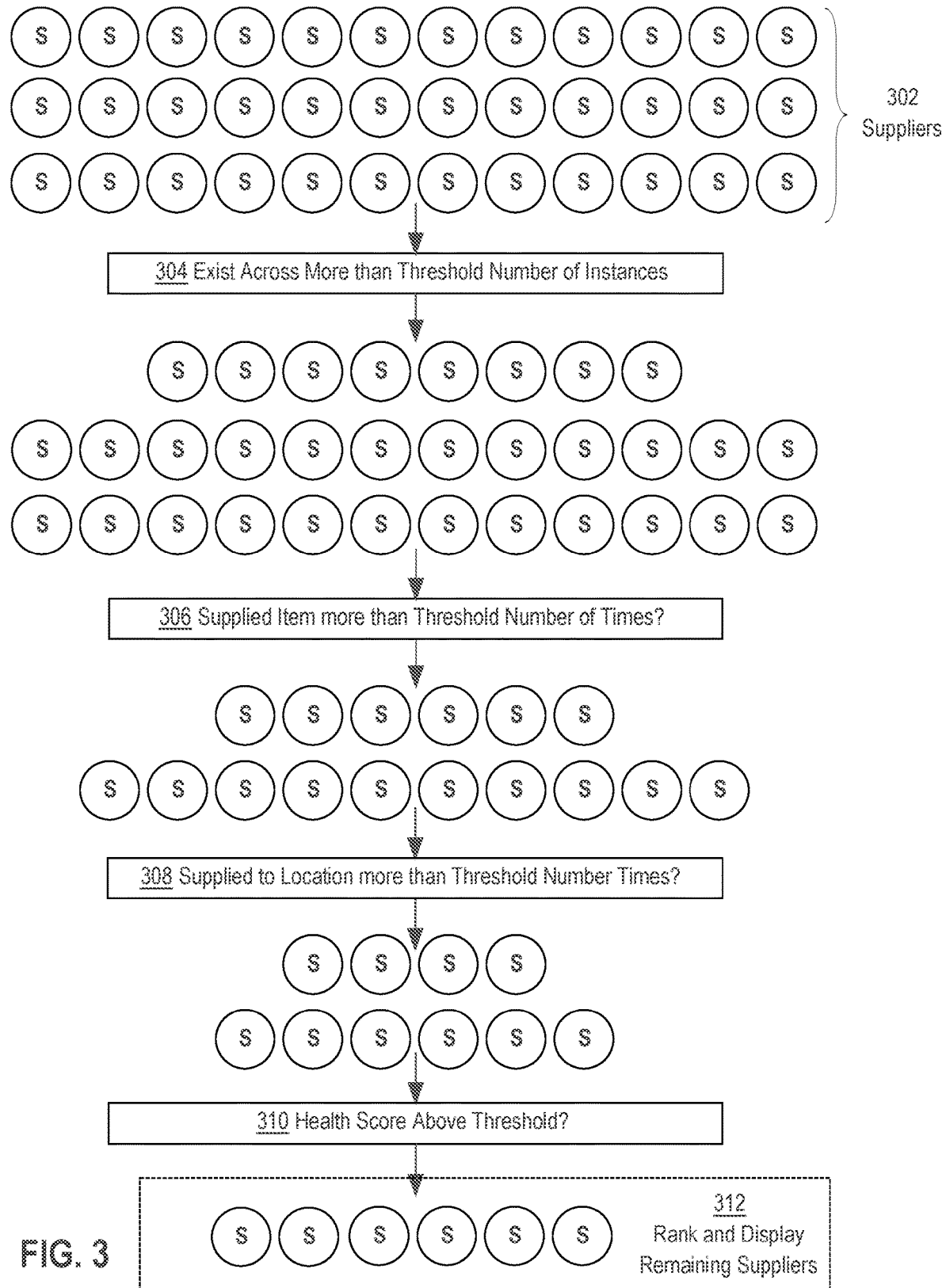
FIG. 3 depicts a method of filtering suppliers based on a supplier request.

FIG. 3 depicts a method of filtering suppliers based on a supplier request. The method of FIG. 3 may be used to identify suppliers based on a request for an item, a type of item, or a sourcing event. While the method of FIG. 3 shows a plurality of filtering steps used in conjunction, the methods described herein may be performed using any combination of one or more of the filtering steps of FIG. 3 in any order.

In FIG. 3, suppliers 302 comprise a plurality of suppliers identified through prior transactions. The suppliers 302 may be normalized supplier identifiers and/or suppliers that have been identified to the system. For example, if the system stores supplier profiles for a plurality of suppliers, the suppliers 302 may include each supplier profile stored by the system.

At step 304, the system filters out suppliers 302 that do not exist across more than a threshold number of instances. For example, the server computer may filter out suppliers do not exist across more than two instances. The instances may refer to individual transactions or sets of transactions. For example, if a supplier sold two different items to a customer in two separate transactions, but both associated with the same billing code and/or tagged event. In an embodiment, the server computer may identify the two separate transactions as a single instance, as the purchases were related to a singular event. Alternatively, the server computer may identify each transaction as a separate instance. By filtering out suppliers based on a threshold number of instances, the server computer avoids identifying small-scale suppliers which are less likely to be able to source new events.

In an embodiment, the system further filters out suppliers that do not exist across a threshold number of unique customers. For example, the server computer may determine, using the transactional data, that a particular supplier has supplied items in a large number of transactions, but all for a single customer. While the supplier may exist across more than the threshold number of instances due to the large number of transactions, the supplier would not exist across the threshold number of unique customers. By filtering out suppliers based on a threshold number of unique customers, the server computer avoids identifying suppliers which supply based on personal relationships with customers.

At step 306, the system filters out suppliers that have not supplied the requested item more than a threshold number of times. The threshold numbers in steps 304, 306, and 308 may be the same number and/or different numbers. For example, step 304 may use two instances as the threshold number while step 306 uses three times as the threshold number. The requested item may include the item type and/or a specifically requested item. For instance, if the supplier request identifies a need for desks, the system may filter for suppliers that have supplied desks more than a threshold number of times. If the request identifies a need for a particular desk and/or desks with particular characteristics, the system may filter for suppliers that have supplied the particular desk and/or desks with the particular characteristics more than the threshold number of times.

In an embodiment, the system further filters out suppliers that have not supplied the requested quantity of the requested item more than a threshold number of times. For example, a particular supplier may have supplied between one and five desks in a large number of transactions with various customers. If a customer requests a supplier for supplying five hundred desks, the server computer may determine whether the particular supplier has supplied five hundred desks in the past. If the particular supplier has not supplied five hundred desks in the past, the server computer may not identify the particular supplier to the requester.

In an embodiment, the server computer identifies suppliers with a capability to provide a requested quantity of the requested item based on prior transactions where the supplier provided a similar quantity of the item. For instance, in the above example, the ability of the supplier to provide five hundred desks in a single transaction is not demonstrated by prior transactions where the supplier supplied up to five desks. Yet if the supplier had transactions in which four hundred and fifty were supplied, the server computer may determine that the supplier is capable of supplying five hundred desks. The server computer may store a threshold percentage, such as twenty percent, such that transactions where the quantity of an item supplied is less that the threshold percentage lower than the requested quantity are still included as transactions where a required quantity was provided.

At step 308, the server computer filters out suppliers that have not supplied to the requesting location more than a threshold number of times. The requesting location may be a pre-defined region which includes the location of the requester. The region may be any of a city, state, country, continent, or other municipalities or principalities. The region may also be separated by other factors, such as trade routes and/or time zones.

Steps 304-308 described above allow the server computer to filter based on prior transactions. The server may make these determinations by identifying, for each of a plurality of transactions, a supplier, a customer, a good provided, a quantity of the good provided, and/or a location to which the good was provided. The server computer may aggregate this data to identify suppliers that have provided goods in different transactions, to different customers, of a requested good type, in a requested quantity, and/or to a requested location. By using the past transaction data which is stored at the server computer, the server computer is able to identify suppliers based on the supplier's history regardless of whether the supplier has identified itself to the system or maintains a supplier profile.

The server computer may store overrides for one or more of the thresholds described above based on data supplied by a supplier. For example, if a supplier sends data to the server computer indicating that the supplier is capable of working with new customers, the server computer may override the threshold requirement that the supplier exists across more than a threshold number of instances or has worked with more than a threshold number of customers. If a supplier has a pre-existing relationship with a customer, the server computer may also override the existence and customer thresholds. The supplier may also identify to the server computer a catalog of items, a quantity of items the supplier is able to supply, and/or locations to which the supplier is able to supply, thereby overriding the item, item quantity, and/or location thresholds.

Additionally or alternatively, the supplier may send data to the server computer to override selection as a supplier for future transactions. For example, if a supplier wishes to scale back the sale of computer desks, the supplier may request that the server computer not include the supplier in a list of suppliers for providing five hundred computer desks regardless of the fact that the supplier has supplied five hundred computer desks many times in the past. If a supplier does not wish to add new customers, the supplier may additionally request to not be included for future transactions for new customers regardless of the number of customers the supplier has previously supplied.

At step 310, the system filters out suppliers that do not have a rating over a particular threshold. For example, the server computer may store supplier health scores for different suppliers as described in U.S. patent application Ser. No. 15/683,689. The server computer may filter out suppliers with health scores below a particular threshold so that the system does not recommend low quality suppliers. The rating may also include averaged user provided ratings, thereby allowing the server computer to filter out suppliers that have received relatively low ratings from one or more users.

Ranking Suppliers

At step 312, the server computer ranks and displays the filtered list of suppliers. Displaying a supplier in the list may include displaying one or more of the supplier's normalized name, the supplier's instance name, contact information for the supplier that is either generally available to the public or made available to the requester, locations covered by the supplier, a user-based rating of the supplier, a supplier health score, a website for the supplier, availability of catalogs for the supplier, data relating to prior transactions between the requester and the supplier, data provided by other customers regarding the supplier, and/or a status of the supplier. The status of the supplier may include whether the supplier has a profile with the system. The supplier's instance name may include a name of the supplier in prior instances with the requester and/or the stored name of the supplier in the system.

Suppliers may be ranked by any of a plurality of factors, such as a number of an item that can be supplied, the supplier's win-rate, the supplier's prior responses, an average price for the item across prior transactions, prior transactions with the requester, a number of different requested items the supplier is capable of supplying, a rating of the supplier, and/or other supplier specific data. In an embodiment, the server computer prioritizes supplier that have previously transacted with the requester in the rankings. The server computer may also deprioritize supplier if the requester previously gave the supplier a low rating or previously engaged in a dispute with the supplier.

In an embodiment, the server computer ranks suppliers by a number of different items the supplier is able to provide. For example, if a request identifies five different items, the server computer may identify filter suppliers for suppliers that are capable of providing any of the five different items. The server computer may then order the suppliers based on a number of the different items the supplier is able to provide. Thus, a supplier who is able to provide the requested quantity of each of the five items may be displayed at the top of the list while a supplier who is only able to provide the requested quantity of a single item of the five items may be displayed at the bottom of the list.

If the server computer is unable to identify, for a particular item, a supplier who is capable of supplying the requested quantity of the particular item, the server computer may display a plurality of suppliers who are capable of supplying any quantity of the particular item. The server computer may rank the suppliers based on a quantity of the item the supplier is capable of supplying such that suppliers who can supply more of the item are ranked higher than suppliers who cannot.

In an embodiment, the server computer factors in the supplier's prior responses into the ranking. For example, the server computer may prioritize suppliers who have previously agreed to sell to customers when included in a list for providing an item. Suppliers who have previously declined to sell to customers when included in a list may be deprioritized. Suppliers who have declined more than a threshold number of times in a row may additionally may be filtered out in future iterations.

In an embodiment, the server computer factors in the supplier's win-rate into the ranking. The supplier's win-rate refers to a percentage of times the supplier indicated a willingness to supply an item that the supplier was requested to supply the item. For example, if the supplier entered bids in three different sourcing events and was selected in one of them, the supplier's win-rate would be 30%.

The factors for ranking suppliers may be applied sequentially and/or in combination. For example, suppliers with prior relationships may be displayed first. Of those suppliers, the suppliers who are capable of supplying all of the requested items may be displayed first. Of those suppliers, the suppliers with the lowest average price for the items may be displayed first and so forth. As another example, ratings, price, and win-rate may be combined into a single score that is used to rank the suppliers.

The methods described herein may be implemented when a customer searches for a particular item, a type of item, or for sourcing a particular event. By using the past transactional data, the system is able to identify suppliers that have a record of being able to supply a requested item at a requested quantity to a requested location.

Sourcing Events

Figure 5:
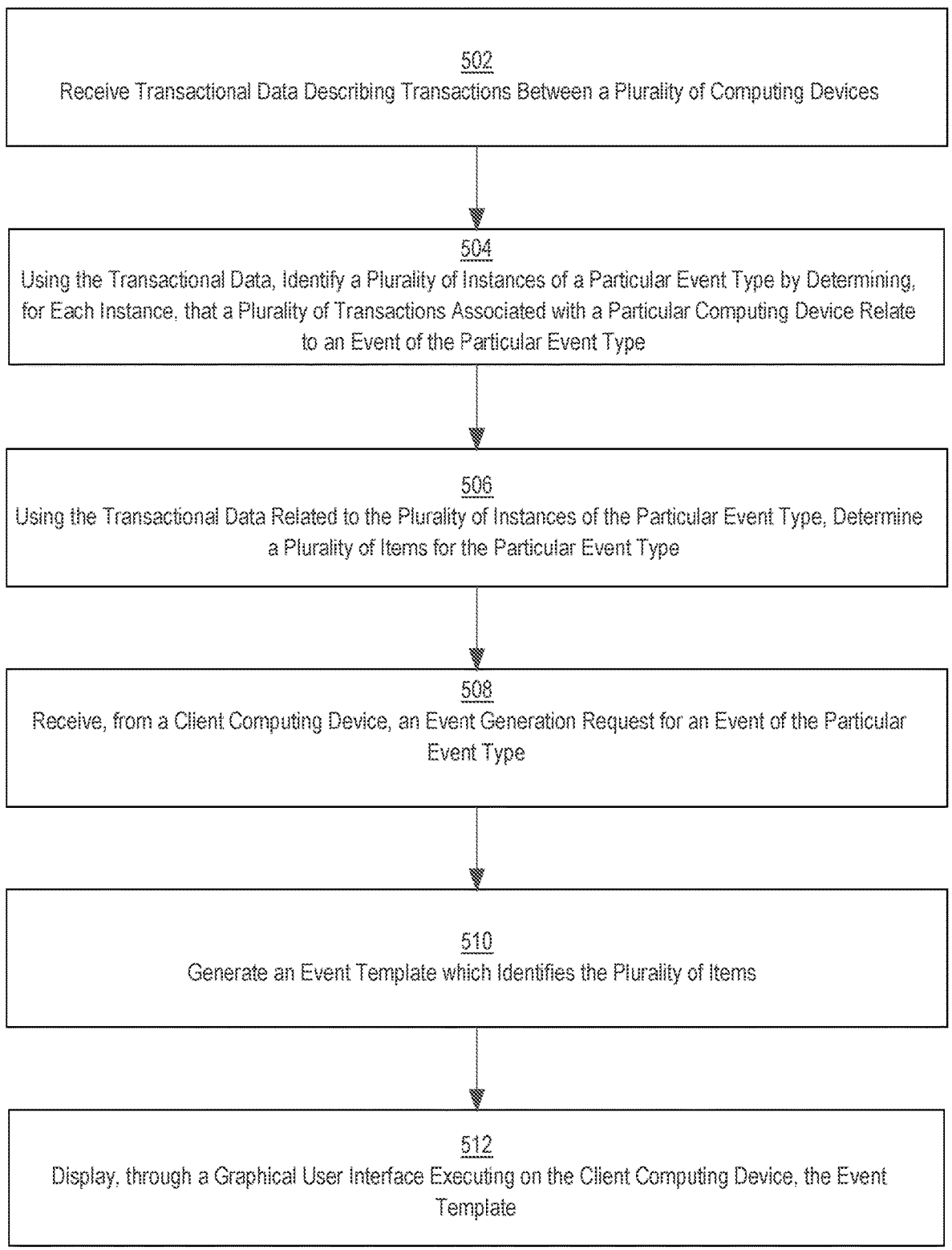
FIG. 5 depicts a method for generating and displaying an event template based on past transactional data.

FIG. 5 depicts a method for generating and displaying an event template based on past transactional data.

At step 502, transactional data describing transactions between a plurality of computing devices is received. For example, the server computer may receive transaction data between a plurality of customers and a plurality of suppliers. In an embodiment, the server computer facilitates one or more of the transactions through a graphical user interface and stores the data relating to the transactions. The transaction data may include any of a customer identifier, a supplier identifier, a customer generated tag, product information, pricing information, a billing code, location data, a rating for a supplier of the transaction, event data, and any other data associated with the transactions. The server computer may additionally receive information that is not tied to individual transactions, such as public contact information of suppliers, website URLs for suppliers, and catalogue information for suppliers.

At step 504, the system, using the transactional data, identifies a plurality of instances of a particular event type by determining, for each instance, that a plurality of transactions associated with a particular computing device relate to an event of the particular event type. Determining that the transactions relate to a particular event type may include identifying event tags relating to a particular event type, billing codes that indicate a specific event type, or purchase patterns that indicate a specific event type.

In an embodiment, the server computer identifies an event instance from a plurality of transactions that include the same customer and the same event tags. Event tags may include digital data associated with one or more transactions that associate the transactions with a particular user. For example, the server computer may display, in a graphical user interface, options to define a tag for a particular transaction. The options for defining a tag may include an editable text box for entering a tag and/or options to select from preexisting tags, such as tags stored by the server computer in association with other transactions from the same and/or different customers. If a user defines a "floor build" tag and adds the tag to five different transactions, the server computer may determine that the five different transactions relate to the same "floor build" event.

The server computer may additionally identify event instances based on billing codes. For example, a particular company may use a special billing code for a project. The server computer may identify multiple transactions from the same customer with the same billing code as belonging to the same event. In an embodiment, the server computer additionally determines whether transactions are within a threshold period of time from each other in order to be grouped into a single project. For example, if the threshold period of time is one month, then transactions with the same billing code from the same customer in a single month may be identified as being part of the same event while a transaction a year later with the same billing code may be identified as part of a separate event.

The server computer may label grouped events based on matching patterns. The server computer may initially identify characteristics of an event type. For example, a tagged "floor plan" event may include transactions for purchase of desks, office chairs, computers, and office supplies such as pens, paper, and paperclips. If the server computer identifies future events from billing codes that include transactions for purchase of desks, office chairs, computers, and office supplies, the server computer may identify the event as a "floor plan" event.

The server computer may additionally use a machine learning tool to identify events based on transactions associated with each other, such as through a common billing code. The machine learning engine may be trained using normalized identifiers of items and/or item types and verified events. For example, a user may identify a plurality of events, each event including a plurality of transactions. The server computer may train a classifier neural network or other machine learning tool using the items from the transactions as inputs and the identified events as the outputs.

In an embodiment, the server computer additionally normalizes event names. For example, events for building out a floor may include tags of "floor plans", "office", "30 ppl floorplan", etc. The server computer may determine that each of the events refer to the same event type, such as through pattern matching of items in the events, similarities in event tags, and/or a machine learning model which is trained using items and/or event tags as inputs and event types as outputs. The server computer may then select a name for events. The selected name may include the most common name for the event types across the plurality of events of the event type and/or a pre-selected name for the event type. For example, an administrator may define the event of "floor build." When normalizing the tagged events, the server computer may select the "floor build" name for the normalization.

Events may also be identified by a customer as belonging to a specific event type. For example, when the customer tags the events, the customer may select from pre-generated event types. Thus, if the server computer stored data identifying the event type of "floor build", the customer may select "floor build" from one or more tag options, such as through a drop-down menu, to be associated with a particular transaction. The server computer may determine that each item tagged with the "floor build" tag option from a single customer is part of the "floor build" event. By allowing users to select from existing event types, the server computer is able to reduce the amount of normalization needed when dealing with different event tags.

At step 506, the system uses the transactional data related to the plurality of instances of the particular event type to determine a plurality of items for the particular event type. For example, for each event of a particular event type, the server computer may identify the transactions associated with the event. The server computer may identify one or more items within the transaction. The one or more items may include supplied goods and/or services. For example, in an instance of the "floor build" event, a first transaction may include the sale of fifty computers, a second transaction may include the sale of fifty desks and fifty office chairs, and a third transaction may include the sale of electrical appliances and a service charge for installing the electrical appliances.

The server computer may normalize the names of items in the transactions using any of the methods described herein. Normalizing the names of items may further include broadening specific items to item types. For example, a particular brand of office chair may be normalized to just "office chair." Thus, determining the plurality of items for a particular event may include normalizing the item names across a plurality of events and determining which normalized item names are associated with the particular event. The server computer may normalize items across only events in an event type, across events in similar categories of event types, across all events, and/or across transactions generally.

Determining the plurality of items for the particular event type may include aggregating all items and/or item types from each of the prior events of the event type. For example, if a first "floor build" event included a transaction for a purchase of desks and computers, a second "floor build" event included a purchase of office chairs and computers, and a third "floor build event included a service charge for installing cabling, the determined plurality of items for the event type may include, at least, desks, computers, office chairs, and cabling installation.

In an embodiment, determining the plurality of items includes selecting items that have only appeared in a threshold number and/or threshold percentage of previous events. For example, if the threshold percentage is 30%, then only items that were included in transactions in 30% of the events may be selected. Thus, if, out of ten prior "floor build" events, five events included a purchase of desks, eight events included a purchase of computers, and two events included cabling installation, then the server computer may select computers and desks for the "floor build" event, but not the cabling installation.

Additionally and/or alternatively, items in events may be ranked by the frequency with which they appear in transactions in prior events. For example, if, in a plurality of prior "floor build" events, office chairs are purchased in 95% of the events, desks are purchased in 80% of the events, and computers are purchased in 65% of the events, the server computer may rank office chairs highest for the "floor build" event, desks second, and computers third. The server computer may be programmed or configured to include each item ordered by ranking, items with more than a threshold number and/or percentage of uses in previous events, and or a threshold number of items selected based on ranking. For example, the server computer may select the top ten ranked items to be included in the event.

At step 508, an event generation request for an event of the particular event type is received from a client computing device. For example, the server computer may provide a graphical user interface with options for creating a new event. The options may include identifiers of events previously identified by the server computer based on prior transactions. Additionally or alternatively, the options may include an editable text box for defining a new event. Based on the data typed into the editable text box, the server computer may search through previously identified events to find one or more events that best match the provided data.

At step 510, the system generates an event template which identifies the plurality of items. For example, when a user selects a particular event type through the graphical user interface, the server computer may generate an event template for the particular event type. The event template includes identification of the plurality of items previously determined for the particular event type. For example, when a user selects the "floor build" event option, the server computer may display a template for the "floor build" event type which includes identification of recommended item purchases, such as computers, office chairs, and desks.

At step 512, the system displays, through a graphical user interface executing on the client computing device, the event template. Displaying the event template may include displaying identifiers of item names for recommended items for the event. The event template may additionally display identifiers of one or more providers for items in the event template. For example, the server computer may use the methods described herein to identify suppliers capable of providing one or more of the items and display identifiers of the suppliers along with the items.

Event Templates

Figure 4:
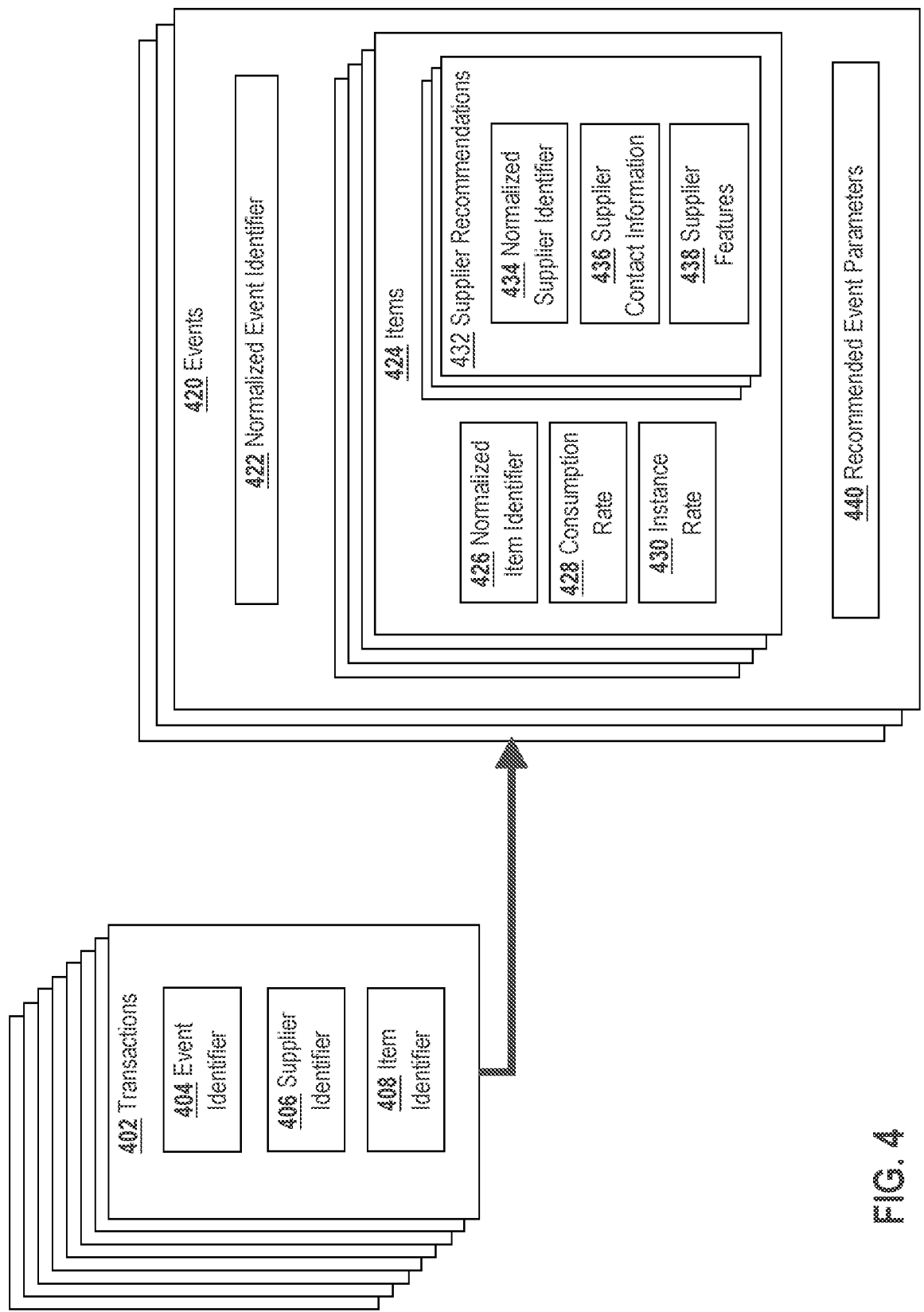
FIG. 4 depicts an example of generating event templates based on a plurality of transactions.

In an embodiment, event templates include item identifiers, provider identifiers, provider features, consumption rates, instance rates, and/or recommended event parameters. FIG. 4 depicts an example of generating event templates based on a plurality of transactions. In FIG. 4, transactions 402 are used to generate events 420. FIG. 4 is presented to provide a clear example and does not restrict the event templates to the items presented. For example, some transactions may include only an event identifier 404 and item identifier 408 while other transactions include a supplier identifier 406 and an item identifier 408. The events 420 may also include less or more features than the ones depicted in FIG. 4.

Transactions 402 include event identifier 404, supplier identifier 406, and item identifier 408. The identifiers for the same feature may differ in format between transactions. For example, office chairs may be called "chairs" in one transaction and "ofc chrs" in a second transaction. In embodiments where events are capable of being defined through user generated tags and/or billing strings, the event identifiers may differ from user to user. As described above, some transactions may include a subset of the three identifiers. For example, transactions that do not include a supplier identifier may still be useful in identifying items for specific event types while transactions that do not include an event identifier may still be useful in identifying suppliers for specific items.

The data from transactions 402 may be used to generate events 420. Events 420 may serve as the basis for an event template. Events 420 may include normalized event identifiers 422, items 424, and/or recommended event parameters 440. Normalized event identifiers 422 include identifiers for each event as determined by the server computer. For example, the server computer identifies a plurality of transactions that relate to the same event type, such as through comparisons of event identifiers 404 and/or item identifiers 408. The server computer may generate a normalized event identifier for the event type, such as through use of a machine learning model as described herein.

Items 424 include data regarding items for a specific event. Items 424 may include a normalized item identifier 426, a consumption rate 428, and/or an instance rate 430. The server computer may normalize item identifiers 408 from a plurality of transaction that relate to the same event type to generate the normalized item identifiers 426 using the methods described herein. Each event may include a plurality of different items, each of which contain a normalized item identifier 426. If an item has only been described using a single item identifier 408 in the plurality of transactions, then the normalized item identifier 426 may match the item identifier 408.

Consumption rate 428 includes data identifying a recommended comparative number of an item. The consumption rate may be based on a number of people, a size of a space, and/or purchase of other items. The server computer may determine the consumption rate 428 for an item based on prior transactions. For example, if a prior floor build event for forty people included a purchase of forty computers, the consumption rate for computers in the prior floor build event would be one computer per person. The server computer may average consumption rates for items between each event. Thus, if a first "floor build" event for twenty people included thirty office chairs while a second "floor build" event for twenty people included forty office chairs, the server computer may average the first consumption rate of 1.5 chairs per person with the second consumption rate of 2 chairs per person to reach a consumption rate of 1.75 chairs per person.

In an embodiment, consumption rates 428 are determined relative to consumption rates of other goods. For instance, transactions related to a prior instance of an event may not indicate a number of people associated with the event. The server computer may determine, for the prior instance of the event, a relationship between the numbers of each item. For example, if a particular instance of a "floor build" event included a purchase of twenty computers and twenty desks, then the server computer may store a ratio of 1:1 for computers and desks. If the event additionally included forty chairs, then the server computer may store a ratio of 1:1:2 for computers, desks, and chairs.

If one or more other "floor build" events identify a number of people for the event, then the ratio for the particular instance may be averaged with the other ratios and then applied to the number of people to generate a consumption rate. For example, if a second event had a ratio of 1:1:1:3 where the first value represents a number of people and the subsequent values represent a number of computers, desks, and chairs, the average of the two ratios when combined would be 1:1:1:2.5. In embodiments where no numeric value is provided in prior transactions, the consumption rate may comprise the ratio of items such that when a user enters in an amount of a first item, the server computer may compute the amounts for the other items based on the ratio and display the amounts to the user.

The instance rates 430 identify a percentage and/or number of prior events of the particular event type that include the items 424. For example, if five out of ten prior events included desks, then the instances rate 430 for desks would be 0.5 or ½. Items may be ordered by instance rate in the event template such that the template prioritizes items for events that are most often purchased.

Supplier recommendations 432 may include recommendations of suppliers for each item. The recommendations may include a normalized supplier identifier 434 generated from supplier identifiers 406, supplier contact information 436, and/or supplier features 438. Supplier contact information may be obtained from supplier contact information in prior transactions and/or from data provided by the supplier when communicating with the server computer, such as in a supplier profile generated by the supplier and stored on the server computer. In an embodiment, supplier recommendations 432 include selectable options for selecting suppliers to add to an event for sourcing the item for which the supplier is recommended. For example, if ten suppliers are recommended for sourcing office desks, a user may select three of the suppliers to be added to the event for sourcing desks. In this manner, the server computer optimizes the way in which the events are generated.

Supplier features 438 may include one or more of the supplier's average cost for the item, a rating for the supplier such as a user rating and/or a supplier health score, supplier win rates, supplier response rates, known discounts, prior relationship data, a number of the item that can be provided, and/or a number of items in the event that can be provided. Supplier features 438 may be displayed for the supplier recommendations and/or used to rank the suppliers. Methods of using past transactions to identify, filter, and rank suppliers are described in the prior sections.

Events 420 may additionally include recommended event parameters 440. Recommended event parameters 440 include parameters that are recommended to optimize an event, such as a sourcing event or bidding event. Events may be optimized to reduce price, time, and/or feasibility. Methods for determining optimal parameters for the events are described further herein.

The server computer may display the event template through a graphical user interface. The interface may include identifiers of each recommended item for the event. The interface may additionally display a recommended number of each item based on consumption rate 428. The instance rate 430 may be displayed and/or used to order the items. Supplier recommendations for each item may be displayed near the item and/or in response to a selection of the item through the graphical user interface. The server computer may additionally track the items purchased and/or added to the event and visually display whether items have been purchased and/or added to the event, such as through a check mark or highlight. The server computer may additionally display any recommended event parameters, such as by automatically generating an event with the parameters.

In an embodiment, events 420 are created for different sectors from transactions from the different sectors. For example, both an office manager and a civil engineer may generate "floor build" events, but the two events may relate to different types of transactions. The server computer may separate events based on sector such that office "floor build" events comprise different items than construction "floor build" events. The server computer may determine the different industries based on customer data, event tags, and/or differences in transactions between the different types of events. For example, the construction "floor build" event may include purchases of carpeting, concrete, and other industrial items, but not office chairs, desks, or computers.

Optimizing Events

In an embodiment, the server computer uses data from prior events to generate recommended event parameters 440. Recommended event parameters 440 may include a type of event, a recommended number of suppliers, an amount of time for the event, a starting price for bidding events, and other parameters related to building events. The server computer may additionally use the prior events to generate estimates, such as final cost estimates and price reduction estimates.

Generating recommended event parameters 440 may include performing pattern matching within the server computer. For example, the server computer may first identify prior events of the same event type. The server computer may compute correlations between item costs and number of suppliers, length of events, starting bid price, event types, number of different items sourced in the event, number of a specific item sourced in the event, and/or one or more other event parameters.

The server computer may use the computed correlations to determine optimal parameters for the event. For example, the server computer may identify, for each of a plurality of "floor build" events, a final cost of office chairs and a number of suppliers in the event. The server computer may compute a correlation between the two values to determine a marginal price benefit of adding an additional supplier. When the price benefit of adding an additional supplier falls below a stored threshold value, the server computer may identify the number of suppliers without the added supplier to be the recommended event parameter for the optimal parameter for the event.

In an embodiment, the server computer may generate correlations between the final price and a plurality of different parameters. Thus, instead of determining the optimal parameter value for each individual parameter independently, the server computer may optimize based on combinations of parameters. For example, the server computer may generate a machine learning system, such as a neural network, which is trained using the parameters for the different events as inputs and the final price of the item and/or a difference between the final price and average price of the item as outputs. Once the machine learning system has been trained, the server computer, may generate a plurality of scenarios with various parameters in order to identify optimal parameters for an event.

The optimized parameters may be used to generate the event template. For example, the server computer may create a sourcing event which uses the optimized bidding parameters, sets the optimized starting prices and minimum bid change values, and indicates an optimal number of suppliers to use in the bidding. The server computer may additionally recommend suppliers for the different items to the client computing device. A user may select from the recommended suppliers in order to finalize the bidding event. The server computer may then execute the bidding event with the requested suppliers and the optimized event parameters.

In an embodiment, the optimized parameters may be presented to the client computing device in order to guide the user in generating a new event. For example, the starting price value may be presented to the user to indicate that the user should lower the event's starting price value if the event's starting price value is higher than the recommended starting price value.

In an embodiment, the server computer additionally optimizes parameters as a function of time. For example, the server computer may use the past transactions to generate correlations of price over time for particular items. Based on the pricing trends, the server computer may compute an optimal bid price for the time when the bid is taking place. Additionally or alternatively, the server computer may determine, based on the correlations of price of item over time, an optimal time to source different parts of the events. For example, if prices on office chairs historically are lowest during a particular month of the year, the server computer may recommend the particular month of the year for sourcing the office chairs.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
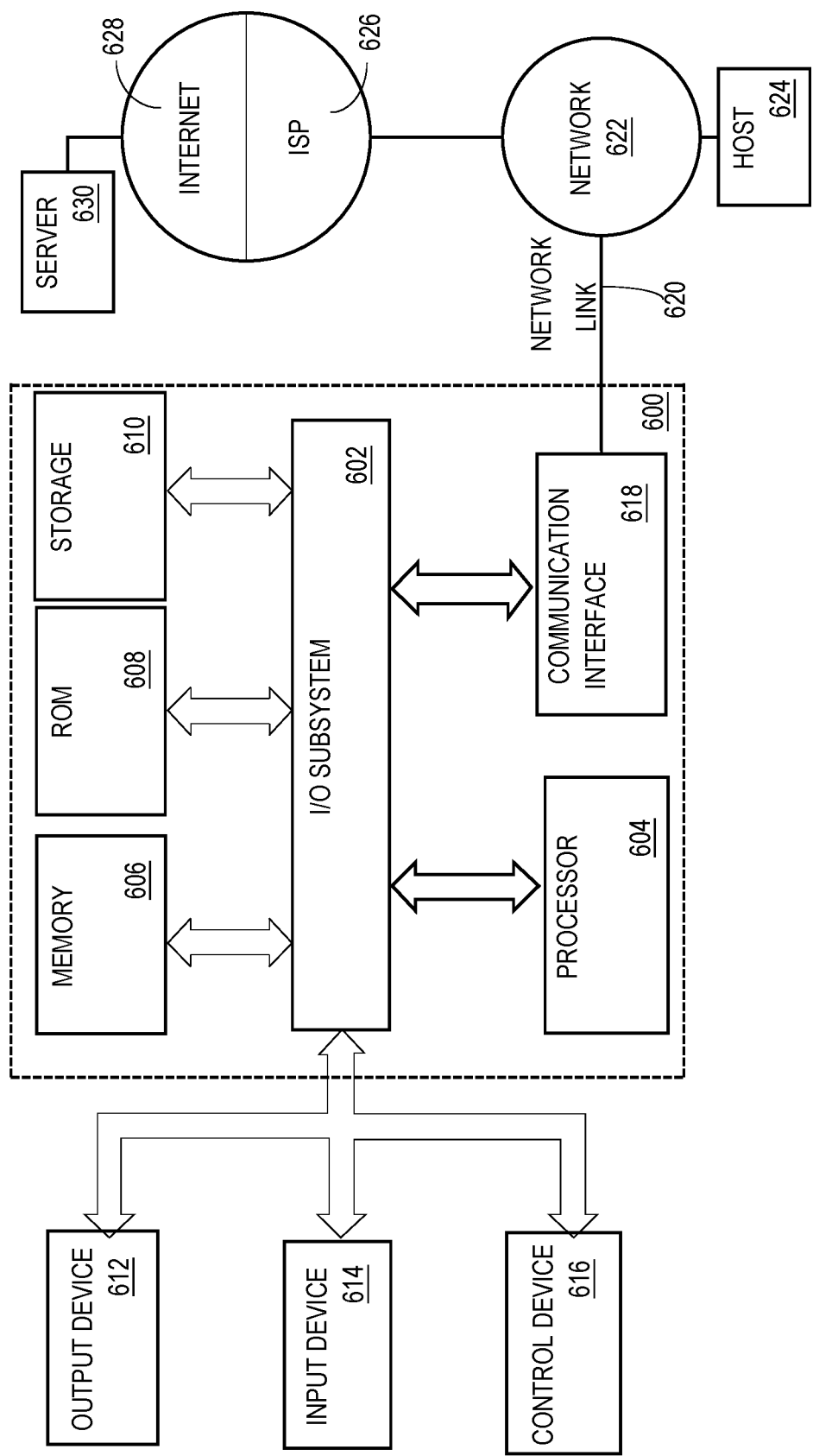
FIG. 6 is a block diagram that illustrates an example computer system with which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A system comprising:
   one or more processors;
   a memory storing instructions which, when executed by the one or more processors, cause performance of:
   receiving transactional data describing transactions between a plurality of computing devices;
   using the transactional data, identifying a plurality of instances of a particular event type by determining, for each instance, that a plurality of transactions associated with a particular computing device relate to an event of the particular event type;
   normalizing identifiers of items in the transactional data;
   using the transactional data related to the plurality of instances of the particular event type, determining a plurality of items for the particular event type using the normalized identifiers;
   receiving, from a client computing device, an event generation request for an event of the particular event type;
   using the transactional data, identifying a number of suppliers for a particular item of the plurality of items which, in past events, have generated a lowest price for the particular item;
   generating an event template which identifies the plurality of items using normalized identifiers of the plurality of items and a recommendation of the identified number of suppliers;
   displaying, through a graphical user interface executing on the client computing device, the event template, displaying the event template comprising populating the graphical user interface with the normalized identifiers of the plurality of items.

2. The system of claim 1, wherein the instructions, when executed by the one or more processors, further cause performance of:
   using the transactional data, identifying a plurality of suppliers of a particular item of the plurality of items;
   displaying, with the event template, recommendations of the plurality of suppliers for the particular item.

3. The system of claim 1, wherein the instructions, when executed by the one or more processors, further cause performance of:
   determining, based, at least in part, on the transactional data related to the plurality of instances of the particular event type, a consumption rate of a particular item;
   wherein the event generation request identifies a size of the event of the particular event type;
   based on the size of the event and the consumption rate of the particular item, determining a number of the particular item for the event;
   displaying, with the event template, a recommendation of the number of the particular item.

4. The system of claim 1, wherein determining that the plurality of transactions associated with the particular computing device relate to an event of the particular event type comprises determining that the plurality of transactions contain a particular data string in a particular field.

5. The system of claim 4, wherein identifying the plurality of instances of the particular event type comprises normalizing data strings in the particular field across the plurality of transactions from the plurality of instances.

6. The system of claim 4, wherein determining that the plurality of transactions associated with the particular computing device relate to an event of the particular event type further comprises determining that particular items identified in the plurality of transactions match items identified in other transactions of the particular event type.

7. The system of claim 1, wherein the instructions, when executed by the one or more processors, further cause performance of:
  using the transactional data, identifying one or more optimal parameters for the particular event type;
  displaying, with the event template, a recommendation of the one or more optimal parameters.

8. The system of claim 7:
  wherein the one or more optimal parameters include a starting price for a particular item of the plurality of items;
  wherein identifying the starting price for the particular item comprises identifying an average price for the particular item in the transactional data.

9. A method comprising:
  receiving transactional data describing transactions between a plurality of computing devices;
  using the transactional data, identifying a plurality of instances of a particular event type by determining, for each instance, that a plurality of transactions associated with a particular computing device relate to an event of the particular event type;
  normalizing identifiers of items in the transactional data;
  using the transactional data related to the plurality of instances of the particular event type, determining a plurality of items for the particular event type;
  receiving, from a client computing device, an event generation request for an event of the particular event type;
  using the transactional data, identifying a number of suppliers for a particular item of the plurality of items which, in past events, have generated a lowest price for the particular item;
  generating an event template which identifies the plurality of items using normalized identifiers of the plurality of items and a recommendation of the identified number of suppliers;
  displaying, through a graphical user interface executing on the client computing device, the event template, displaying the event template comprising populating a graphical user interface with the normalized identifiers of the plurality of items.

10. The method of claim 9, further comprising:
  using the transactional data, identifying a plurality of suppliers of a particular item of the plurality of items;
  displaying, with the event template, recommendations of the plurality of suppliers for the particular item.

11. The method of claim 9:
  determining, based, at least in part, on the transactional data related to the plurality of instances of the particular event type, a consumption rate of a particular item;
  wherein the event generation request identifies a size of the event of the particular event type;
  based on the size of the event and the consumption rate of the particular item, determining a number of the particular item for the event;
  displaying, with the event template, a recommendation of the number of the particular item.

12. The method of claim 9, wherein determining that the plurality of transactions associated with the particular computing device relate to an event of the particular event type comprises determining that the plurality of transactions contain a particular data string in a particular field.

13. The method of claim 12, wherein identifying the plurality of instances of the particular event type comprises normalizing data strings in the particular field across the plurality of transactions from the plurality of instances.

14. The method of claim 12, wherein determining that the plurality of transactions associated with the particular computing device relate to an event of the particular event type further comprises determining that particular items identified in the plurality of transactions match items identified in other transactions of the particular event type.

15. The method of claim 9, further comprising:
  using the transactional data, identifying one or more optimal parameters for the particular event type;
  displaying, with the event template, a recommendation of the one or more optimal parameters.

16. The method of claim 15:
  wherein the one or more optimal parameters include a starting price for a particular item of the plurality of items;
  wherein identifying the starting price for the particular item comprises identifying an average price for the particular item in the transactional data.

17. A computer system comprising:
  one or more processors;
  a memory coupled to the one or more processors;
  one or more sequences of program instructions in the memory which, when executed by the one or more processors, cause performance of:
  receiving buyer-supplier transactional data describing transactions in physical goods between a plurality of computing devices of a buyer entity and a supplier entity and comprising one or more of electronic purchase orders and electronic invoices;
  normalizing identifiers of physical goods in the buyer-seller transactional data;
  using the transactional data, identifying a plurality of instances of a particular event type by determining, for each instance, that a plurality of transactions associated with a particular computing device relate to an event of the particular event type;
  using the transactional data related to the plurality of instances of the particular event type, determining a plurality of physical goods for the particular event type;
  receiving, from a client computing device, an event generation request for an event of the particular event type;
  using the transactional data, identifying a number of suppliers for a particular physical good of the plurality of physical goods which, in past events, have generated a lowest price for the particular physical good;
  generating an event template which identifies the plurality of physical goods using normalized identifiers of the plurality of physical goods and a recommendation of the identified number of suppliers;
  displaying, through a graphical user interface executing on the client computing device, the event template, displaying the event template comprising populating a graphical user interface with the normalized identifiers of the plurality of physical goods.

* * * * *